(12) United States Patent
Liu

(10) Patent No.: US 7,003,010 B2
(45) Date of Patent: Feb. 21, 2006

(54) MULTI-GROUP MULTI-WAVELENGTH LASER MATRIX

(76) Inventor: Zhongshan Liu, 8125 Haning Dr., Plano, TX (US) 75025

( * ) Notice: Subject to any disclaimer, the term of this patent is extended or adjusted under 35 U.S.C. 154(b) by 287 days.

(21) Appl. No.: 10/399,669

(22) PCT Filed: Nov. 21, 2001

(86) PCT No.: PCT/US01/44004

§ 371 (c)(1),
(2), (4) Date: Apr. 21, 2003

(87) PCT Pub. No.: WO02/43202

PCT Pub. Date: May 30, 2002

(65) Prior Publication Data

US 2005/0100060 A1 May 12, 2005

Related U.S. Application Data

(60) Provisional application No. 60/253,004, filed on Nov. 27, 2000.

(51) Int. Cl.
*H01S 3/30* (2006.01)
*H01S 3/10* (2006.01)
*H01S 3/03* (2006.01)
*H01S 3/09* (2006.01)
*H01S 3/08* (2006.01)

(52) U.S. Cl. ............... 372/64; 372/6; 372/23; 372/69; 372/99

(58) Field of Classification Search ............ 372/6, 372/12, 20, 23, 49, 64, 69, 70, 99
See application file for complete search history.

(56) References Cited

U.S. PATENT DOCUMENTS

| | | | |
|---|---|---|---|
| 4,645,293 A | 2/1987 | Yoshida et al. | |
| 4,873,691 A | 10/1989 | Uomi et al. | |
| 4,885,753 A | 12/1989 | Okai et al. | |
| 5,216,680 A | 6/1993 | Magnusson et al. | |
| 5,598,300 A | 1/1997 | Magnusson et al. | |
| 6,154,480 A | 11/2000 | Magnusson et al. | |
| 6,289,032 B1 | 9/2001 | Fay et al. | |

*Primary Examiner*—Minsun Oh Harvey
*Assistant Examiner*—Armando Rodriguez
(74) *Attorney, Agent, or Firm*—A Z Patent Law Firm

(57) ABSTRACT

A laser system capable of producing multiple groups of output wavelengths is disclosed. In one embodiment, an optical fiber bundle doped with erbium (Er) or erbium/ytterbium (Er/Yb) is perpendicularly attached to an optical device, which serves as a guided-mode resonance feedback mirror, to form a fiber laser matrix. The optical device contains a substrate layer, a waveguide layer, and a grating layer, with non-uniform device parameters. The wavelength of the resonant light and its corresponding laser light of an individual optical fiber depends upon the parameters in the location on the optical device where the fiber is attached. In another embodiment, a plurality of active waveguides in a body are attached to an optical device to form a diode-pumped crystal laser matrix with multi-group output wavelengths. The invented laser system is capable of generating laser sources of large channel capacity for the optical network especially for the dense wavelength division multiplexing (DWDM) system.

52 Claims, 7 Drawing Sheets

Wavelength

Non-uniform thickness direction

Non-uniform gradient direction

MULTI-GROUP MULTI-WAVELENGTH LASER MATRIX

This application claims the benefit of Provisional Application No. 60/253,004, filed Nov. 27, 2000.

FIELD OF THE INVENTION

The present invention relates generally to optical networks, and more particularly to multi-wavelength laser technology.

BACKGROUND OF THE INVENTION

Multi-wavelength lasers (MWLs) are useful in providing multiple-channel light sources for optical networks, especially for dense wavelength division multiplexing (DWDM) systems. The desirable features of MWLs used for DWDM systems include compact design, high stability in output wavelengths and wavelength spacing, reasonable output power, wide wavelength range and narrow linewidth for a large channel capacity, convenience of modulating individual wavelength at a high rate, and easiness of manufacture. In addition, the wavelength-locking mechanisms of MWLs should be as simple as possible. No existing MWL provides all those features largely because of the limitations in current laser technologies.

A number of MWL technologies have been investigated, and they can be generally classified into two types: MWL array and shared-gain MWLs. An MWL array consists of a row of single-wavelength lasers such as distributed feedback (DFB) lasers and distributed Bragg reflector (DBR) lasers. Each DFB or DBR laser in the laser array can be tuned and locked in a channel, and modulated individually.

One of unsolved problems with DFB or DBR MWLs is uneven wavelength drifting that can cause cross-talks. The output wavelength of a channel depends upon the combined effects of junction temperature and injection currents (diode pumping current, wavelength tuning current, and phase shifting current). The channel tuning mechanisms of current MWL arrays are very complex. Since the output wavelength of an individual laser in the array is a function of its junction temperature, any fluctuation in the temperature of the diode will cause its output wavelength to drift. To keep output wavelengths locked in their channels, it is essential to maintain the junction temperature constant. Heat sinks capable of precisely controlling temperature are ordinarily used to keep output wavelengths stable. Also, the costs for making such laser arrays are very high.

In shared-gain MWLs, laser channels share one gain region by integrating multi-resonance feedback elements with one gain media, thereby yielding a number of output wavelengths. One of the advantages of this design is stable output wavelength spacing even when all output wavelengths drift simultaneously. It is more difficult to modulate individual channels for most of the existing shared-gain MWLs than for MWL arrays. U.S. Pat. No. 6,289,032 discloses a self-collimating MWL laser, which simultaneously permits broad-beam collimation and monomode operation, with simultaneous emission of multiple wavelengths from a single aperture. While this design results in stable wavelength spacing, it does not allow direct or internal modulation of each individual wavelength. This design may have a limited channel capability.

DISCLOSURE OF THE INVENTION

The objective of this invention is to provide a multi-group multi-wavelengths laser source for optical networks especially for DWDM optical fiber communication systems. The laser system disclosed in this invention has several advantages over conventional DFB and DBR lasers. In one aspect, it has a large channel capacity. In another aspect, it is thermally and electrically stable in output wavelengths and channel spacing. In addition, the laser system can have a selectable bandwidth as broad as the full gain spectrum of the active medium. Finally, it is cost-effective in production.

The basic elements of the invented laser system include a group of active waveguides arranged in a matrix form for providing optical gain, a wavelength selectable optical device that is able to selectively feed back lights with different wavelengths, and an optical pumping mechanism or module for causing electron-population inversion in the active waveguides. The active waveguides used in the exemplary embodiments include optically active fibers and glass-based or crystal-based active waveguides. A fiber can be made optically active by doping it with rare earth elements such as erbium and erbium/ytterbium (Er/Yb).

In one of the embodiments, the active waveguides are erbium-doped fibers. FIG. 1 shows the energy diagram of the three-level energy system of erbium ion ($Er^{3+}$). The erbium-doped fiber pumped by 0.98 $\mu$m or 1.48 $\mu$m light can amplify 1.55 $\mu$m optical signal. As shown in the diagram, light at the wavelength of 0.98 $\mu$m is absorbed by the erbium ions; and the absorbed photons excite the erbium ions and cause them to transit from ground state to higher energy level, $^4I_{11/2}$. The excited erbium ions then rapidly decay non-radioactively to a long-lived metastable state, $^4I_{13/2}$. The population of erbium ions in metastable state, $^4I_{13/2}$, is accumulated. The population of erbium ions in metastable state may also be directly produced by pumping the erbium ions with light at 1.48 $\mu$m. The transition of an erbium ion from the metastable state to the ground state is a radioactive process that emits a photon at the wavelength around 1.55 $\mu$m. This process may occur spontaneously, but it is much more probable when it is stimulated by a traveling photon around 1.55 $\mu$m. This stimulated emission provides an optical gain of the light around 1.55 $\mu$m as it travels through the erbium-doped fiber.

An optical cavity is formed in a piece of erbium-doped fiber by making the facets at both ends highly reflective. This can be done by traditional methods such as thin-film coating and distributed Bragg grating. If the gain of light in a round trip in the optical cavity is bigger than optical loss, a fiber laser is formed. Since the technique of fabricating erbium/ytterbium (Er/Yb) doped fibers is well developed, they are used in the embodiment.

In contrast to the shared-gain MWL designs, this invention uses a wavelength selectable optical device (FIG. 2b) as a shared feedback mirror for multiple gain regions. The wavelength selectable optical device 10 contains a substrate layer 11, a grating layer 14, and a waveguide layer 13, which is non-uniform in its thickness or refractive index. When the optical device 10 is used as a feedback mirror at one of the end facets of an optically active fiber bundle (FIG. 5), it can feed lights with different wavelengths back to different optically active fibers. The optical device can also function as output couplers for generating multi-group wavelength outputs.

The principle upon which the wavelength selectable optical device works as a wavelength selectable feedback mirror is guided-mode resonance. Guided-mode resonance occurs in waveguide gratings where guided modes that would be supported by the waveguide without refractive index modulation are possible. However, since there is a periodic modulation or perturbance of the refractive index in or around the waveguide layer, the propagation constant $\beta_i$ (See following Equation 2) becomes a complex number and the imaginary part of $\beta_i$ cannot be neglected. Thus, the waveguide modes cannot propagate without loss in the waveguide. This structure is called a "leaky" structure because the energy from the guided modes does not propagate within the waveguide but leaks out of the structure. In this "leaky" structure, the energy of the incident optical wave is "fed" by the diffractive element into the periodically modulated or perturbed waveguide, then the "leaky" mode is coupled into certain space-harmonic waves, which are propagating waves. However, due to the phase-matching conditions, the "feeding" is strongly selective with respect to the incident wavelength, the angle of incidence, and the polarization state of the incident wave. Only the energy from the incident wave that strictly satisfies the resonance conditions can be fed into the structure. For the visible and near infrared range, the grating period $\Lambda$ is in most cases in the sub-micron scale to allow only zero diffraction orders to propagate in reflection and transmission while all higher order waves are cut off. In this case, 100% reflection can be obtained at a desired narrow wavelength range. The bandwidth is typically less than a few nanometers while side bands have low reflectivity. Thus, the optical device can be used as a wavelength selectable mirror.

The guided-mode resonance phenomenon is well described by the rigorous coupled-wave theory (S. S. Wang, R. Magnusson, J. S. Bagby, and M. G. Moharam, "Guided-mode resonances in planar dielectric-layer diffraction gratings," J. Opt. Soc. Am. A, Vol. 8, pp. 1470–1475, August 1990; S. S. Wang and R. Magnusson, "Multilayer waveguide-grating filters," Appl. Opt., Vol. 34, pp. 2414–2420, May 1995; and T. K. Gaylord and M. G. Moharam, "Analysis and applications of optical diffraction by gratings," Proc. IEEE, Vol. 73, pp. 894–937, May 1985). The coupled-wave equations governing wave propagation in the waveguide can be expressed as $$\frac{d^2 \hat{S}_i(z)}{dz^2} + \left[k^2 \varepsilon_g - k^2\left(\sqrt{\varepsilon_g} \sin\theta - i\frac{\lambda}{\Lambda}\right)^2\right]\hat{S}_i(z) + \frac{1}{2}k^2 \Delta\varepsilon\left[\hat{S}_{i+1}(z) + \hat{S}_{i-1}(z)\right] = 0, \quad (1)$$

where $\hat{S}_i(z)$ is the amplitude of the inhomogeneous plane wave of the i-th space harmonic, $k=2\pi/\lambda$ is the free space wave number, $\Delta\varepsilon=(\varepsilon_H-\varepsilon_L)/2$ is the permittivity modulation, $\varepsilon_g=\overline{\varepsilon_g}(X)=(\varepsilon_H+\varepsilon_L)/2$ is the average permittivity of th waveguide layer, $\Lambda$ is the grating period, and $\lambda$ is the free-space wavelength. As $\Delta\varepsilon \to 0$ (weak modulation), allowing $$\beta_i = k(\varepsilon_g^{1/2} \sin\theta - i\lambda/\Lambda), \quad (2)$$

equation (1) becomes $$\frac{d^2 \hat{S}_i(z)}{dz^2} + (k^2 \varepsilon_g - \beta_i^2)\hat{S}_i(z) = 0. \quad (3)$$

Equation (3) has the same appearance as the wave equation associated with an unmodulated slab waveguide. Similar to the eigenvalue of the unmodulated slab waveguide, the corresponding eigenvalue equation of the modulated waveguide is, in this limit, $$\tan(\kappa_i d) = \frac{\kappa_i(\gamma_i + \delta_i)}{\kappa_i^2 - \gamma_i \delta_i} \quad (4)$$

for TE polarization, and is $$\tan(\kappa_i d) = \frac{\varepsilon_g \kappa_i(\varepsilon_3 \gamma_i + \varepsilon_1 \delta_i)}{\varepsilon_1 \varepsilon_3 \kappa_i^2 - \varepsilon_g^2 \gamma_i \delta_i} \quad (5)$$

for TM polarization, where $\kappa_i = \sqrt{\varepsilon_g k^2 - \beta_i^2}$, $\gamma_i = \sqrt{\beta_i^2 - \varepsilon_1 k^2}$, and $\delta_i = \sqrt{\beta_i^2 - \varepsilon_3 k^2}$. Equations (4) and (5) can be used to predict approximately the wavelength and incident angle location of the resonance for a given structure. The propagation constant, $\beta_i$, of the waveguide grating in the limit of $\Delta\varepsilon \to 0$ is thus determined explicitly by the basic waveguide grating parameters, grating period $\Lambda$, average permittivity of the waveguide layer, $\varepsilon_g$, the thickness of the waveguide layer, incident angle, $\theta$, the free space wavelength, $\lambda$, and mode index i.

The spectral response of a guided-mode resonant reflective filter predicted by this theory is very close to the ones obtained experimentally (See "High-efficiency guided-mode resonance filter", Z. S. Liu, S. Tibuleac, D. Shin, P. P. Young, and R. Magnusson, Optics Letters, Vol. 23, No. 19, Oct. 1, 1998). The peak reflection wavelength of a wavelength selectable optical device is determined by parameters such as grating periods, grating fill factors, refractive indices (the square of permittivity) of the substrate, waveguide, and grating layers, input medium, and the thickness of the waveguide layer at the position where the resonant modes occur. Any changes in these parameters will cause a shift in the wavelength of the peak reflection. Thus, when those parameters are non-uniform, the wavelength selectable optical device is able to reflect different wavelengths at different positions along the non-uniform direction. The most convenient parameters for achieving various peak reflection wavelengths are the thickness of the waveguide layer and the grating period of the grating. Making a waveguide layer with non-uniform refractive indices is more complicated, but existing techniques can be modified for this purpose. Equations (4) and (5) can also be used to estimate the peak reflection wavelength for any point on a wavelength selectable optical device with multiple non-uniform device parameters.

FIG. 2a illustrates a qualitative relationship between the peak reflection wavelengths of the optical device and the positions on the optical device. FIG. 3a shows theoretically predicted reflection spectra for an optical device containing a waveguide layer of non-uniform thickness using the following device parameters: refractive index of substrate or spacer=1.47, refractive index of the waveguide layer=2.0, refractive index of grating=1.5, refractive index of the medium above the surface-relief grating=1.0, thickness of grating=50 nm, grating period=920 nm, the separation distance between any two adjacent points=0.5 mm, thickness of the waveguide layer is from 317 nm to 371 nm, corresponding to the position from 0 to 3.5 mm on the optical device, as shown in FIG. 3b. The incident lights and reflected lights are TE (e.g., the electric vector normal to the grating vector)

polarized. For convenience, only eight reflection spectra for eight evenly separated points on the optical device are computed. As shown in FIG. 3a, all eight reflection peaks are evenly separated in the wavelength range from 1530 nm to 1565 nm. However, all wavelengths from 1530 nm to 1565 nm are available as the peak reflection wavelengths while their individual output wavelength spacing for a specific optical device may be constrained by the geometry of active waveguides with which the optical device is used. For a given number of active waveguides in a defined geometrical arrangement in a laser matrix, any wavelength can be assigned as the peak reflection wavelength to any of the active waveguides by designing the profile of non-uniform parameters.

Theoretical reflection spectra of an optical device with non-uniform grating periods are shown in FIG. 4a. The device parameters used in the computation are as follows: refractive index of substrate or spacer=1.47, refractive index of the waveguide layer=2.4, refractive index of grating=2.0, refractive index of the material embedding the grating=1.5, thickness of the waveguide layer=350 nm, thickness of grating=50 nm, thickness of the embedding layer=300 nm (exclusive of the grating thickness), and grating periods varied from 718.5 nm to 775.1 nm (FIG. 4b). Peak reflection wavelengths can be anywhere from 1500 nm to 1600 nm. By designing a proper non-uniform grating period profile for a given active waveguides geometry, it is possible to achieve evenly separated reflection peaks or desirable wavelength spacing combs.

While the two computations are conducted for cases involving only one varying device parameter, it is obvious to predict reflection wavelengths for an optical device with more than one varying parameter in any direction along the optical device.

The number of output wavelengths is determined by the number of active waveguides and their layout in the matrix. The active waveguides are identical to each other except they are located in different locations so that the lights from them are able to strike the different part of area on the optical device. Of course, the output wavelength range of the laser matrix must fall within the gain spectrum of the active waveguides.

The output wavelength spacing between two adjacent lasers depends upon the degree of the non-uniformity of relevant parameters of the optical device and the distance between two adjacent active waveguides at a point near the optical device. The wavelength spacing can be arbitrarily small because the difference in the parameters between two adjacent active waveguides can be arbitrarily small.

All layers of the wavelength selectable optical device can be made of dielectric materials such as $SiO_2$, $Si_3N_4$, $HfO_2$, $Al_2O_3$, and $TiO_2$ or semiconductor materials such as Si, InP, GaAs, AlGaAs, and InGaAsP. To improve the line shapes of its reflection spectra, the wavelength selectable optical device may further include any or all of the following three components: a thin-film layer on top of the grading surface, a thin-film layer between the grating layer and the waveguide layer, and a thin-film layer between the waveguide layer and the substrate.

The wavelength selectable optical device can be externally mounted to the body containing an active waveguide matrix to form external optical cavities. An optical device can be assembled with one of its surfaces facing one of the light-emitting facets of the active waveguides, with a micro-lens matrix placed between the optical device and the active waveguides.

The wavelength selectable optical device used in the present invention is a passive element. No injection current flows through it. Thus, the refractive indices of all layers of materials of the device are stable. Since the output wavelengths depend only upon the positions on the device, the output wavelengths of the laser matrix will be stable even when the powers of pumping lights are varied. Furthermore, the device can be fabricated using materials with high thermal stability, thus the output wavelengths of the laser matrix are thermally stable as well.

In summary, a multi-group multi-wavelength laser matrix is achieved by using a wavelength selectable optical device as a shared feedback mirror in one of the end facets of a laser matrix consisting of identical active waveguides. The laser system can provide multiple signal channels for multiple optical fibers. The outputs from the laser matrix feature single-mode, narrow-linewidths, highly polarized beams, arbitrary wavelength spacing, high thermal and electrical stability, and low divergence. Those features make this invented laser system a good laser source for optical networks, especially for DWDM systems.

DETAILED DESCRIPTION OF THE PREFERRED EMBODIMENTS

In one of the embodiments, active waveguides used in a laser matrix are erbium-doped optical fibers. The optical cavities of the fiber laser matrix are formed by attaching one end of an erbium-doped fiber bundle to a wavelength selectable device and by coating the other end of the fiber bundle with a thin-film stack of high reflectivity. The thin-film layer has a reflection peak centered at wavelength of 1.55 $\mu$m.

The optical device has different peak reflection wavelengths at different positions on the optical device, and each fiber laser has an output wavelength corresponding to the peak reflection wavelength of the optical device at the corresponding position. When such a system is pumped by 0.98 μm or 1.48 μm pumping light, it can generate laser outputs with multi-group multi-wavelengths. Each fiber laser in the laser matrix can be designed to possess a single-mode, highly polarized, and narrow-linewidth output. Of course, all the output wavelengths are within the gain spectrum of the erbium-doped fibers.

Figure 1:
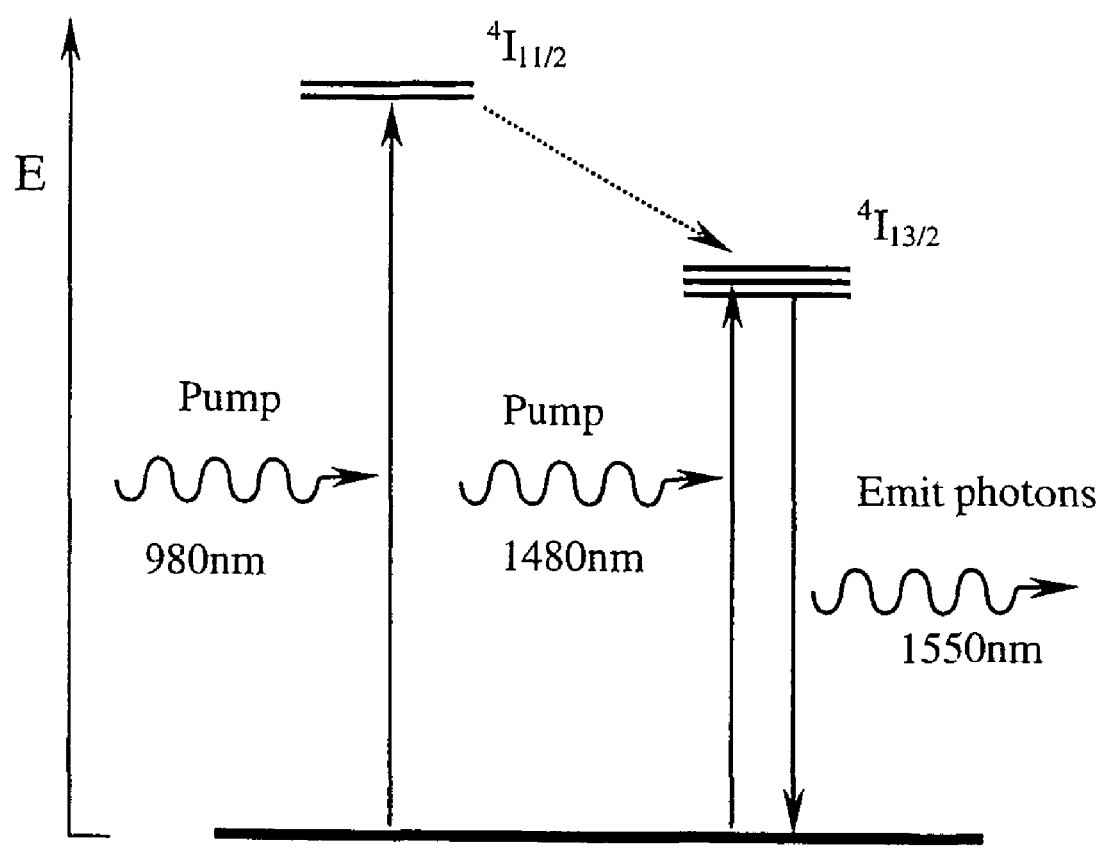
FIG. 1 illustrates the energy level diagram of $Er^{3+}$.
Figure 2A:
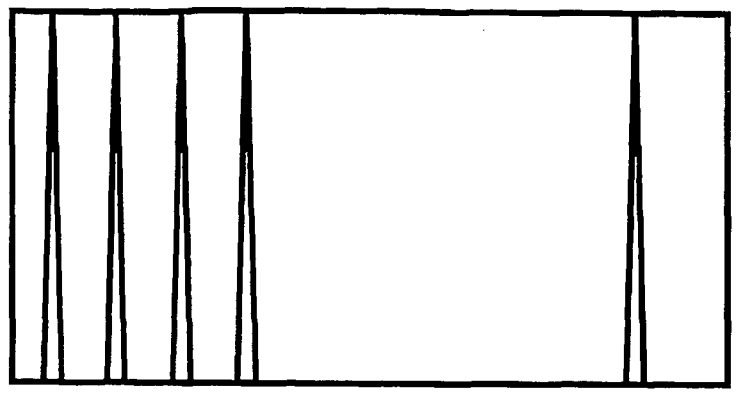
FIG. 2a illustrates qualitative reflection spectra of a wavelength selectable optical device.
Figure 2B:
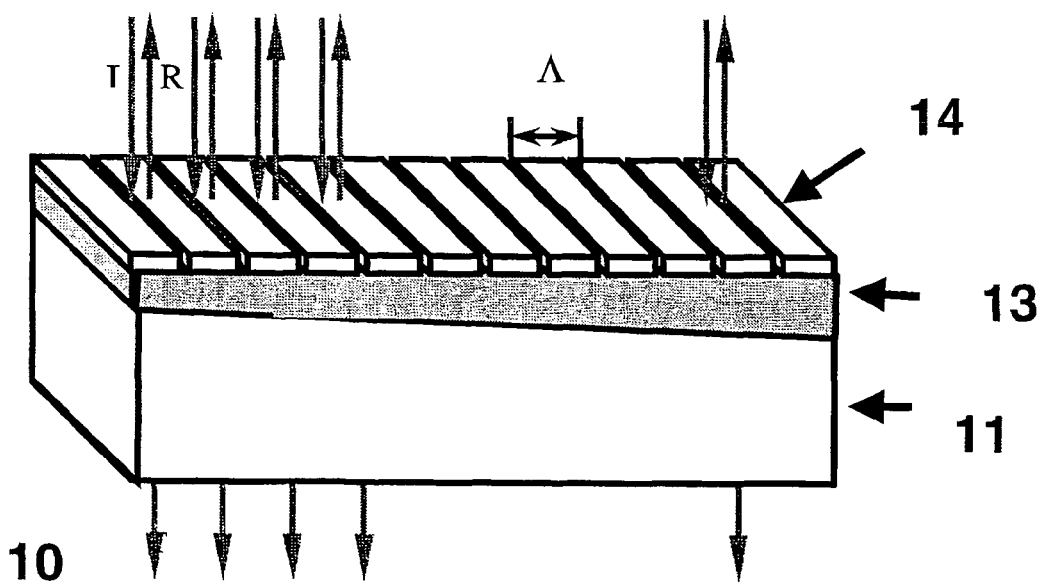
FIG. 2b illustrates a schematic view of a wavelength selectable optical device.
Figure 3A:
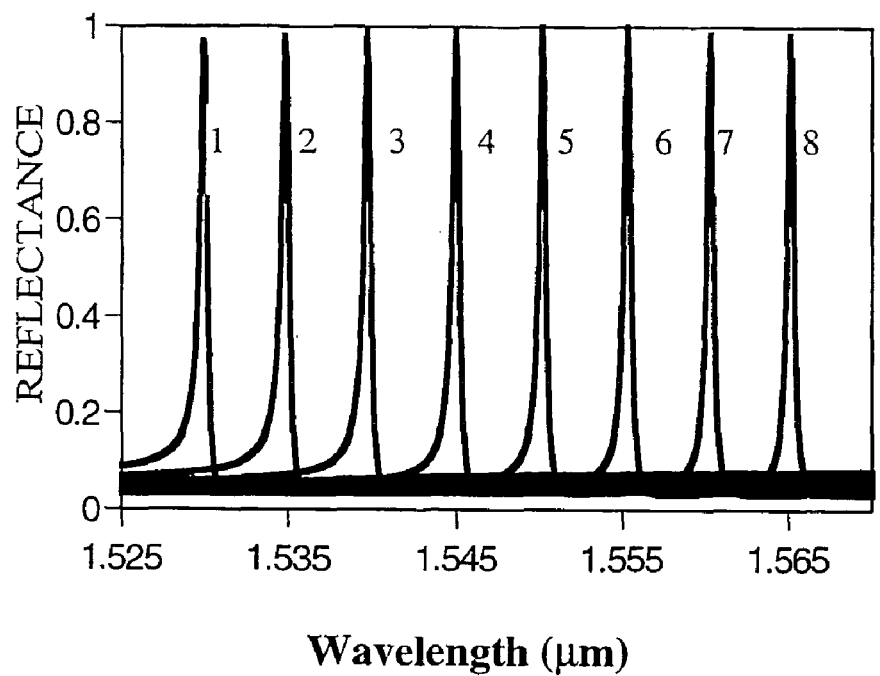
FIG. 3a illustrates reflection spectra predicted for a wavelength selectable optical device containing a waveguide layer of non-uniform thickness.
Figure 3B:
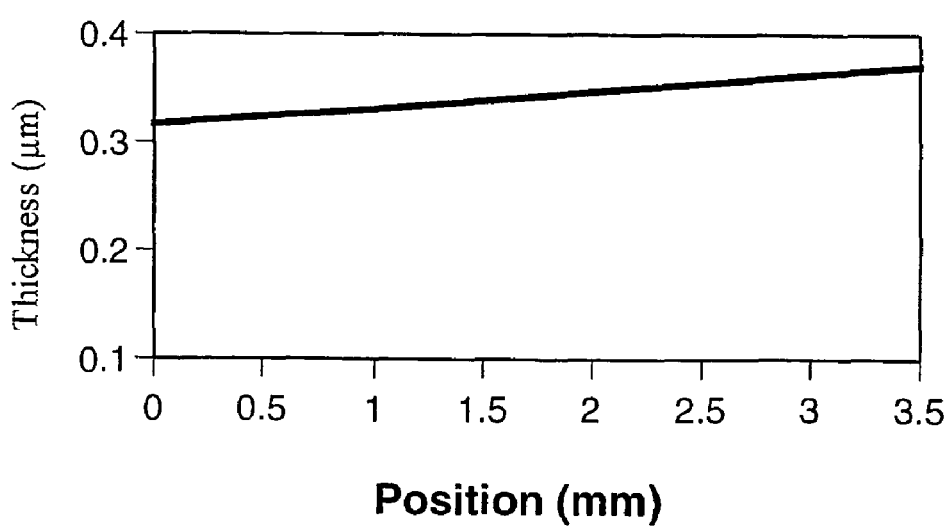
FIG. 3b illustrates the thickness profile of the wavelength selectable optical device used in FIG. 3a computation.
Figure 4A:
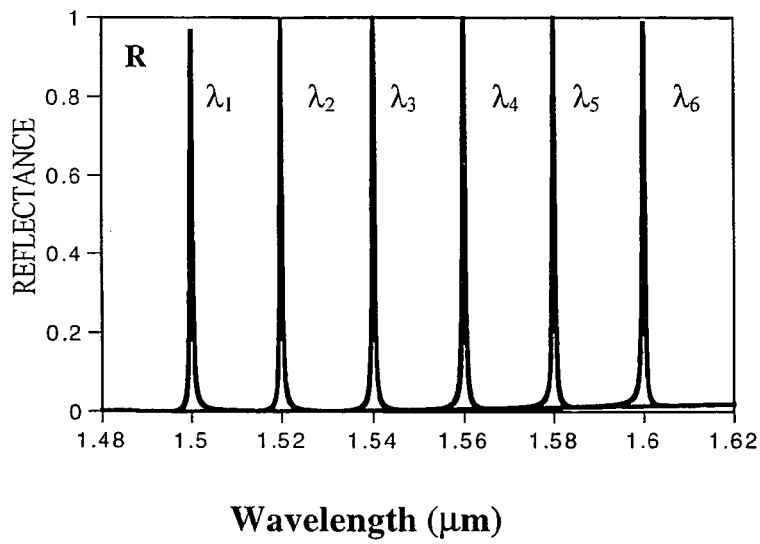
FIG. 4a illustrates reflection spectra predicted for a wavelength selectable optical device containing a grating layer with non-uniform grating periods in one direction.
Figure 4B:
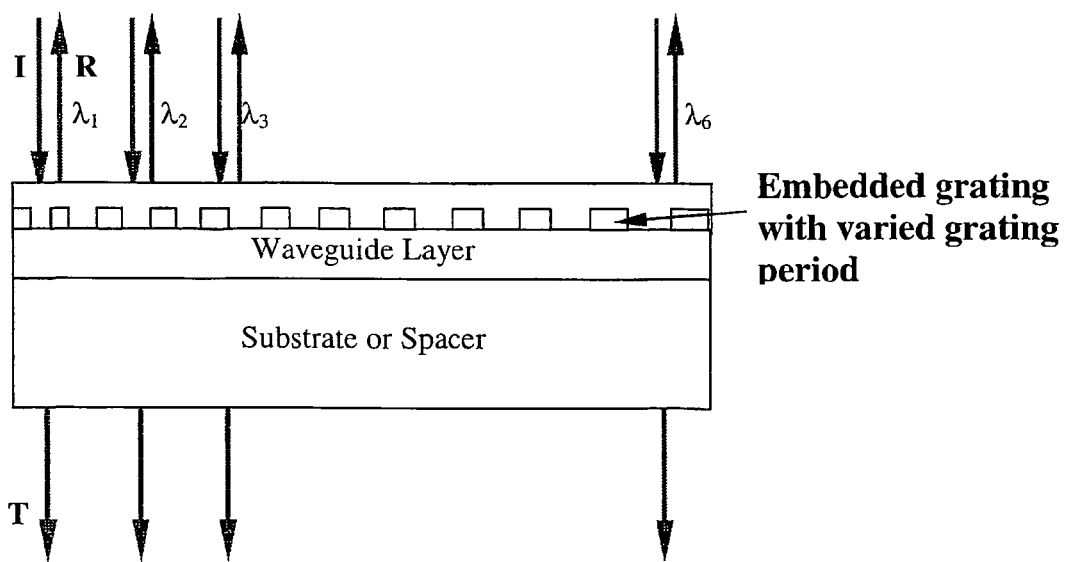
FIG. 4b illustrates the grating period profile of the wavelength selectable optical device used in FIG. 4a computation.
Figure 5:
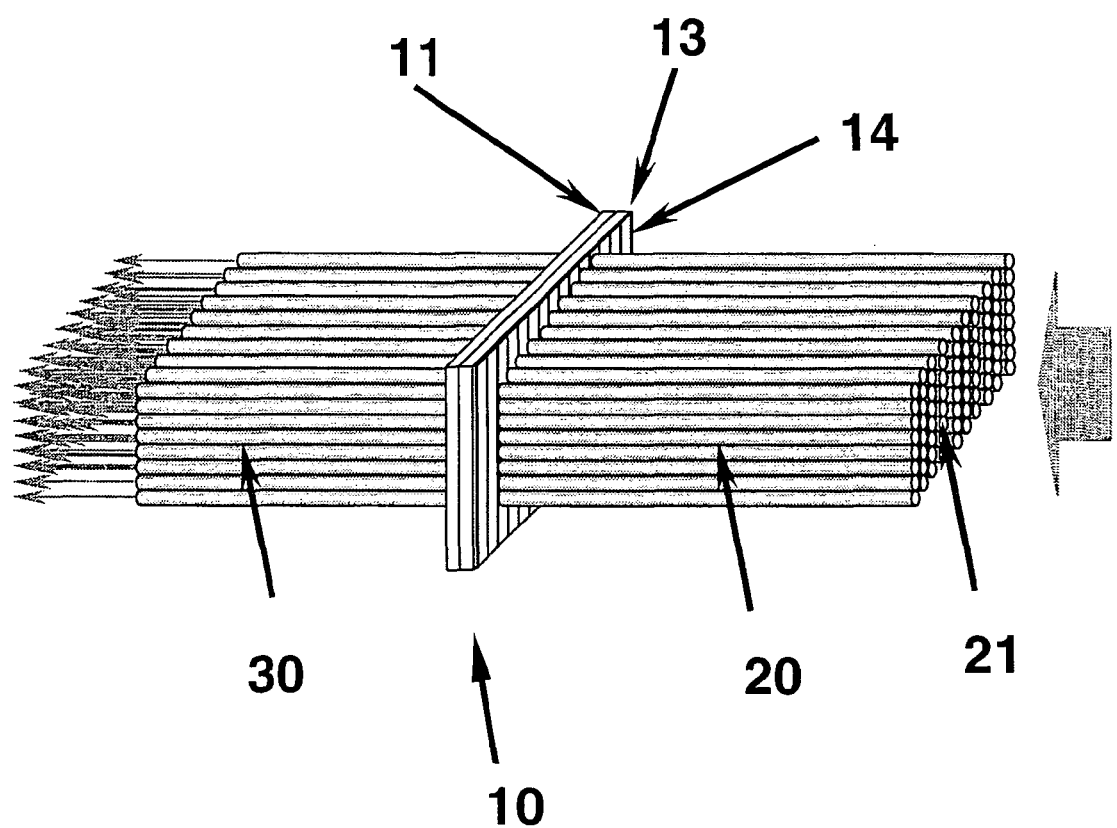
FIG. 5 illustrates a fiber laser matrix for generating multi-group multi-wavelengths.

The detailed structure of the fiber laser matrix is shown in FIG. 5. The key components include an erbium-doped fiber bundle 20, a highly reflective thin-film coated facet 21 at one end of the erbium-doped fiber bundle, a wavelength selectable optical device 10, and a receiving fiber bundle 30. The optical device 10 contains a spacer 11 (equivalent to a substrate), a waveguide layer 13 with non-uniform thickness or refractive index, and a grating layer 14 on top of the waveguide layer 13. The refractive index of the spacer is less than that of the waveguide layer. The erbium-doped fiber bundle 20 is arranged to form a matrix with the end facets of the fibers at one end (not shown) falling on a plane. The end facets of the fibers are further arranged to form a matrix, which collectively face or are attached to the optical device 10. The end facets of the matrix may be arranged in the form of square (FIG. 6a) or in the form of triangle (FIG. 6b). The end-facet matrix of the receiving fiber bundle 30 has exactly the same layout as does the erbium-doped fiber bundle 20 although missing individual receiving fibers will not adversely affect the performance of other fiber lasers.

Figure 6A:
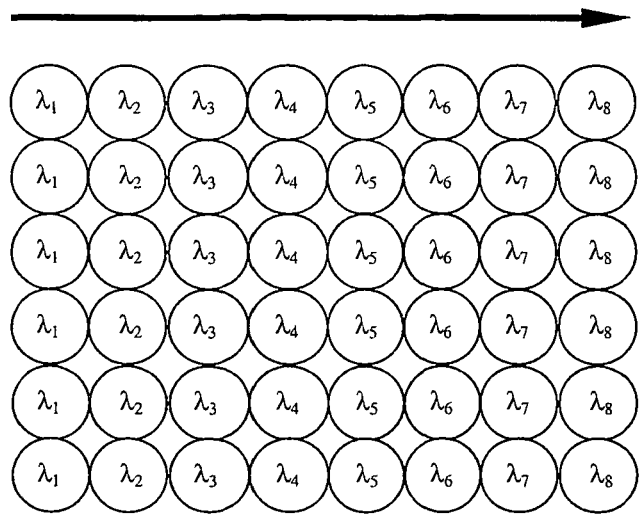
FIG. 6a illustrates the wavelength output map of a fiber laser matrix where the end facets are arranged in a square form.
Figure 6B:
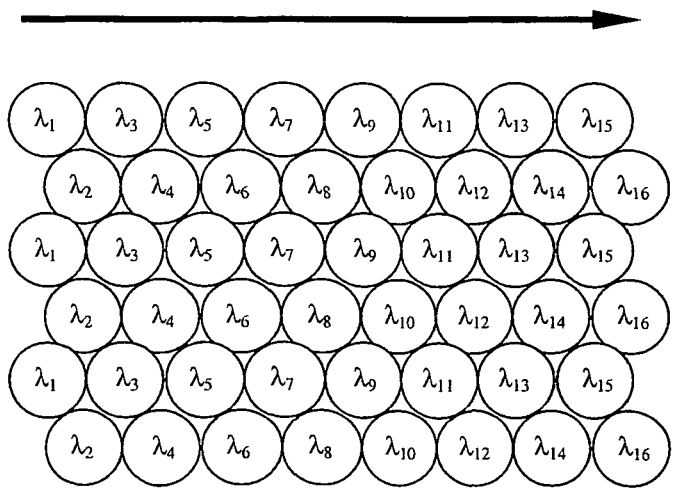
FIG. 6b illustrates the wavelength output map of a fiber laser matrix where the end facets are arranged in a triangle form.

The wavelength output map for this specific embodiment is illustrated in FIGS. 6a and 6b. There is a 6 rows×8 columns end-facet matrix. The direction of the non-uniformity of the optical device is parallel with the row direction of the end facets in the matrix (FIG. 6a). Thus, there are 8 different wavelengths, corresponding to the 8 fibers in each row. The 6 fibers in each column in the end-facet matrix have the same output wavelength since the local parameters in those positions on the optical device are identical in this example. Thus, there are 6 identical groups of output wavelengths, with each group having 8 different output wavelengths. Generally, fiber-laser matrices can contain N rows and M columns fibers. The system can generate N groups of M wavelengths. When it is used in a fiber optical network, it can provide laser sources of M channels to N trunk fibers. As a special case, when M is one, a fiber-laser array for generating multi-wavelength outputs is resulted.

The end-facet layout in the end-facet matrix can also be arranged with the maximum fill factor (to occupy the least volume) as shown in FIG. 6b according to another example of the invention. Like the previous example, the non-uniformity direction of the optical device is parallel to the row direction of end-facet matrix of the erbium-doped fiber bundle. The end-facet matrix in this example has 6 rows, each of which contains 8 erbium-doped fibers. Every alternative row is displaced along the non-uniformity direction by half of the distance between two adjacent erbium-doped fibers. All rows are packed together so they are able to contact each other. As shown in the FIG. 6b, the centers of any two adjacent end facets and the center of the nearest end facet of a neighbor row form a triangle. Every two adjacent rows of the laser fibers can generate a group of outputs with 16 different wavelengths. In total, the matrix has 3 identical groups outputs, with each group having 16 output wavelengths. In general, when the end facets in an N by M matrix are arranged with the maximum fill factor, the laser matrix has N/2 groups identical outputs, each of which have 2M different output wavelengths. When it is used in a fiber optical network, it can provide laser sources of 2M channels to N/2 trunk fibers.

Figure 7:
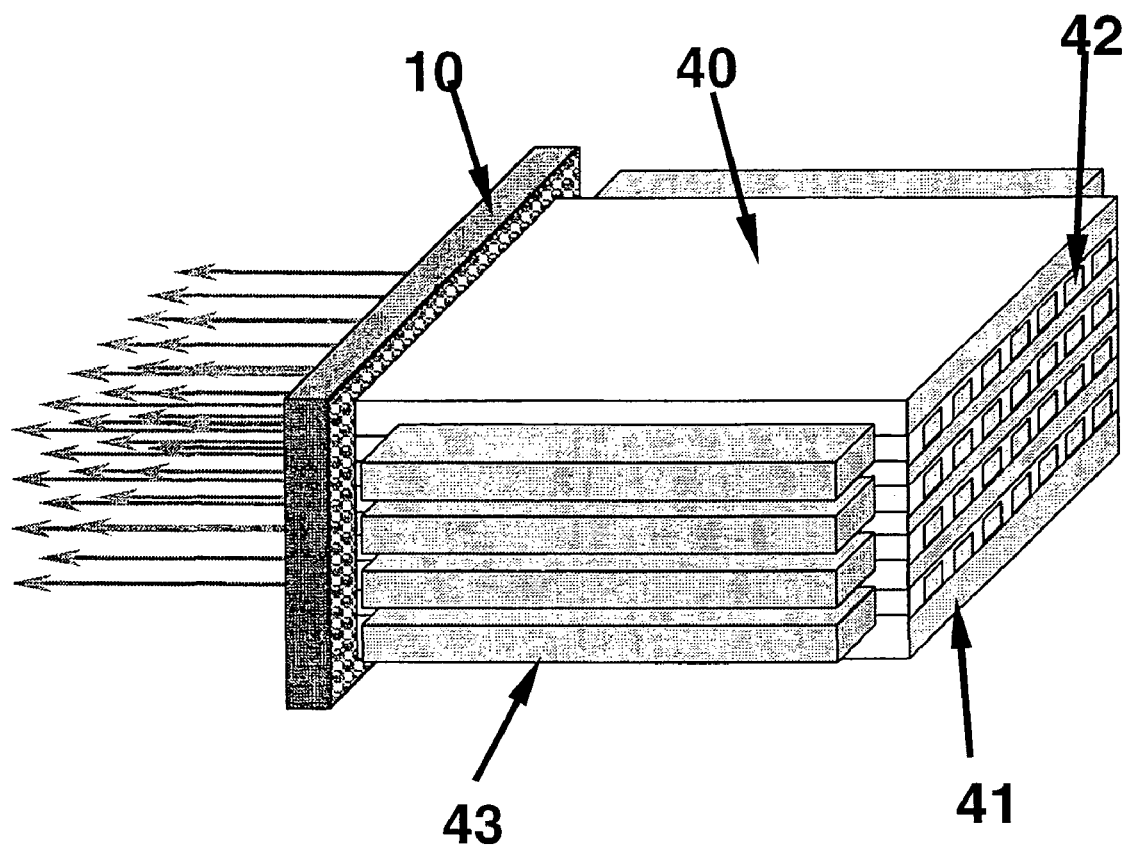
FIG. 7 illustrates a diode-pumped crystal-based waveguide laser matrix.

In the third example of the embodiments, the concept of this invention is extended to diode-pumped crystal laser. Shown in FIG. 7 is a multi-group multi-wavelength diode-pumped crystal-laser matrix. The key components are a plurality of glass- or crystal-based active waveguides 42, a high-reflection thin-film coated facet 41 at one of the ends of the active waveguides 42, an optical device 10, and a number of pumping diode laser bars 43. The optical device has a similar structure as those described in the previous examples. Laser cavities are formed by the high-reflection coated facets 41, the active waveguides 42, and the optical device 10. The active waveguides 42 in the waveguide matrix pumped by laser-diode-bar 43 provide optical gain. For the same reason discussed in the first sample of the fiber-laser matrix, the laser matrix can generate laser outputs with N groups of M wavelengths.

A laser matrix using a wavelength selectable optical device may serve as a laser source for DWDM systems. The disclosed MWL matrix in this invention features compact size, high stability in output wavelengths and wavelength spacing, broad wavelength selectivity, convenience of use, and low costs for mass production. When a fixed manufacturing process is developed for mass production, individual units are expected to achieve uniform performance characteristics. By designing the profile of non-uniform parameters for a wavelength selectable optical device, each reflection wavelength for a corresponding laser unit can be locked into a particular wavelength channel. For a wavelength selectable optical device that is designed to have a linear relation between its peak reflection wavelength and its position in one direction, the output wavelengths may be shifted by changing the position of the optical device along the row direction of the laser matrix. This method may be useful in some situations to correct errors in designing and fabricating the optical device.

The wavelength selectable optical device can be fabricated using existing techniques. Methods of fabricating grating on a surface are art known by those skilled in the art. Typical techniques include holographic interference, phase mask, electron beam writing, and laser-beam writing. Electron beam writing and laser-beam writing can be used to fabricate gratings with varying grating periods. Thin-film deposition, a well-known technique, can be used for fabrication of the waveguide layer. Taped or stepped waveguide layer can be fabricated by using thin-film deposition technique in combination with a precisely controlled moving mask on the deposited surface. Perhaps, selective etching process may be used to create non-uniform structures (U.S. Pat. No. 6,309,975 to Wu, et al.). Layers with non-uniform refractive indices may be made by thin-film deposition using two or more material sources. Other components such as active waveguides and light-pumping modules are commercially available.

In the exemplary embodiments of the invention, specific components, arrangements, and assemble processes are used to describe the invention. Obvious changes, modifications, and substitutions may be made by those skilled in the art to achieve the same objectives of this invention. The exemplary embodiments are, of course, merely examples and are not intended to limit the scope of the invention. The present invention is intended to cover all other embodiments that are within the scope of the appended claims and their equivalents.

What is claimed is:

1. A laser system comprising:
   An optical device comprising: a substrate layer; a waveguide layer on the substrate layer; a grating layer on the waveguide layer on the side opposite to the substrate layer; and means for varying reflection wavelengths along any direction of the waveguide layer;

At least three active waveguides having first end facets and second end facets, the first end facets of the active waveguides being attached to the optical device with the first end facets being arranged in the form of matrix, the second end facets being coated with a thin-film stack, At least one light supply module which is capable of generating pumping light with its energy sufficiently high for exciting the active waveguides; the thin-film stack on the second facets being substantially transparent to the pumping light but is optically reflective to the light for output;

Means for coupling laser lights from the laser system for output.

2. The laser system of claim 1 wherein the means for varying reflection wavelengths is selected from a group consisting of non-uniform thickness of the waveguide layer along any direction on its central plane, non-uniform refractive index of the waveguide layer along any direction on its central plane, non-uniform grating periods in the grating layer along any direction on the layer, and combinations thereof.

3. The laser system of claim 2 wherein the active waveguides are optical fibers doped with a material selected from a group consisting of erbium and erbium/ytterbium, the light supply modules are able to generate the pumping lights in wavelength selected from a group consisting of 0.98 um, 1.48 um and combinations thereof, the thin-film stack on the second facets is transparent to the pumping lights while it has high reflectivity to the light at the wavelength around 1.55 um.

4. The laser system of claim 3 wherein the first end facets of the active fibers are arranged in the form of matrix, with its basic elements substantially in the form of square shape.

5. The laser system of claim 4 further comprising at least one receiving fiber attached to the optical device on the side opposite to the side to which the active fibers are attached, at least one of the receiving fibers being arranged with its axis falling in the extension lines of the active fibers whereby the receiving fiber is able to receive laser beams during laser operation.

6. The laser system of claim 5 wherein a plurality of the light supply modules provide the pumping lights of different intensities to the active fibers.

7. The laser system of claim 6 further comprising at least one component selected from a group consisting of a thin-film layer on top of the grading surface, a thin-film layer between the grating layer and the waveguide layer, and a thin-film layer between the substrate and the waveguide layer, and combination thereof.

8. The laser system of claim 5 wherein one light supply module provides the pumping light to the active fibers.

9. The laser system of claim 5 wherein the number of a plurality of the receiving fibers is equal to the number of the active fibers, and the axes of the receiving fibers fall in the extension lines of the active fibers.

10. The laser system of claim 4 further comprising a micro-lens matrix between the optical device and the active fibers.

11. The laser system of claim 3 wherein the first end facets of the active fibers are arranged to form a matrix, with its basic elements substantially in the form of triangle shape.

12. The laser system of claim 11 further comprising at least one receiving fiber attached to the optical device on the side opposite to the site to which the active fibers are attached, at least one of the receiving fibers being arranged with its axis falling in the extension lines of the active fibers whereby the receiving fiber is able to receive laser beams during laser operation.

13. The laser system of claim 12 wherein a plurality of the light supply modules provide the pumping lights of different intensities to the active fibers.

14. The laser system of claim 13 further comprising at least one component selected from a group consisting of a thin-film layer on top of the grading surface, a thin-film layer between the grating layer and the waveguide layer, and a thin-film layer between the substrate and the waveguide layer, and combination thereof.

15. The laser system of claim 12 wherein one light supply module provides the pumping light to the active fibers.

16. The laser system of claim 12 wherein the number of a plurality of the receiving fibers is equal to the number of the active fibers, and the axes of the receiving fibers fall in the extension lines of the active fibers.

17. The laser system of claim 16 further comprising at least one component selected from a group consisting of a thin-film layer on top of the grading surface, a thin-film layer between the grating layer and the waveguide layer, and a thin-film layer between the substrate and the waveguide layer, and combination thereof.

18. The laser system of claim 3 further comprising a micro-lens matrix between the optical device and the active fibers.

19. The laser system of claim 3 wherein one light supply module provides the pumping light to the active fibers.

20. The laser system of claim 3 wherein a plurality of the light supply modules provide the pumping lights of different intensities to the active fibers.

21. The laser system of claim 2 further comprising a micro-lens matrix between the optical device and the active waveguides.

22. The laser system of claim 2 wherein one light supply module provides the pumping light to the active waveguides.

23. The laser system of claim 2 wherein a plurality of the light supply modules provide the pumping lights of different intensities to the active waveguides.

24. The laser system of claim 1 further comprising a micro-lens matrix between the optical device and the active waveguides.

25. The laser system of claim 1 wherein one light supply module provides the pumping light to the active waveguides.

26. The laser system of claim 1 wherein a plurality of the light supply modules provide the pumping lights of different intensities to the active waveguides.

27. The laser system of claim 1 wherein the means for varying reflection wavelengths is selected from a group consisting of non-uniform thickness of the waveguide layer along a first direction, non-uniform refractive index of the waveguide layer along the first direction, non-uniform grating periods in the grating layer along the first direction, and combinations thereof.

28. The laser system of claim 27 wherein the active waveguides are optical fibers doped with a material selected from a group consisting of erbium and erbium/Ytterbium, the light supply modules are able to generate the pumping lights in wavelength selected from a group consisting of 0.98 um, 1.48 um and combinations thereof, and the thin-film stack on the second end facets is transparent to the pumping lights while it has high reflectivity to the light at the wavelength around 1.55 um.

29. The laser system of claim 28 wherein the first end facets of the active fibers are arranged to form a matrix, with its basic elements substantially in the form of square shape.

30. The laser system of claim 29 further comprising at least one receiving fiber attached to the optical device on the side opposite to the side to which the active fibers are attached, at least one of the receiving fibers arranged with its axis falling in the extension lines of the active fibers whereby the receiving fiber is able to receive laser beams during laser operation.

31. The laser system of claim 30 wherein a plurality of the light supply modules provide the pumping lights of different intensities to the active fibers.

32. The laser system of claim 31 further comprising at least one component selected from a group consisting of a thin-film layer on top of the grading surface, a thin-film layer between the grating layer and the waveguide layer, and a thin-film layer between the substrate and the waveguide layer, and combination thereof.

33. The laser system of claim 30 wherein one light supply module provides the pumping light to the active fibers.

34. The laser system of claim 30 wherein the number of a plurality of the receiving fibers is equal to the number of the active fibers, and the axes of the receiving fibers fall in the extension lines of the active fibers.

35. The laser system of claim 28 further comprising a micro-lens matrix between the optical device and the active fibers.

36. The laser system of claim 28 wherein the first end facets of the active fibers are arranged to form a matrix, with its basic elements substantially in the form of triangle shape.

37. The laser system of claim 36 further comprising at least one receiving fiber attached to the optical device on the side opposite to the site to which the active fibers are attached, at least one of the receiving fibers being arranged with its axis falling in the extension lines of the active fibers whereby the receiving fiber is able to receive laser beams during laser operation.

38. The laser system of claim 37 wherein a plurality of the light supply modules provide the pumping lights of different intensities to the active fibers.

39. The laser system of claim 38 further comprising at least one component selected from a group consisting of a thin-film layer on top of the grading surface, a thin-film layer between the grating layer and the waveguide layer, and a thin-film layer between the substrate and the waveguide layer, and combination thereof.

40. The laser system of claim 37 wherein one light supply module provides the pumping light to the active fibers.

41. The laser system of claim 37 wherein the number of a plurality of the receiving fibers is equal to the number of the active fibers, and the axes of the receiving fibers fall in the extension lines of the active fibers.

42. A laser system comprising:
a body having a first surface on one side of the body and a second surface on the opposite side of the body;
at least three active waveguides arranged in the form of an matrix in the body; each of the active waveguide having a first end facet failing in the first surface of the body and a second end facet falling in the second surface of the body, the wave propagating direction of each of the activeguides being perpendicular to the second surface of the body, the second surface of the body being coated with a high-reflection thin-film stack;
An optical device comprising: a substrate layer; a waveguide layer on the substrate layer; a grating layer on the waveguide layer on the waveguide layer on the side opposite to the substrate layer; and means for varying reflection wavelengths along any direction of the waveguide layer, the optical device being substantially parallel with the second surface of the body whereby the resonant lights from the active waveguides are able to strike different parts of the areas of the optical device during laser operation; and
At least one pumping diode laser bar installed along the body for exciting the active waveguides; and
means for coupling laser beams from the laser system for outputs.

43. The laser system of claim 42 wherein the means for varying reflection wavelengths is selected from a group consisting of non-uniform thickness of the waveguide layer along a first direction, non-uniform refractive index of the waveguide layer along the first direction, non-uniform grating periods in the grating layer along the first direction, and combinations thereof.

44. The laser system of claim 43 wherein the first end facets of a plurality of the active waveguides are arranged in the form of matrix.

45. The laser system of claim 44 further comprising at least of one component selected from a group consisting of a thin-film layer on top of the grading surface, and a thin-film layer between the grating layer and the waveguide layer, and a thin-film layer between the substrate and the waveguide layer, and combinations thereof.

46. The laser system of claim 45 wherein the diode laser bars are able to provide pumping lights to the active waveguides at various pumping levels during laser operation.

47. The laser system of claim 46 further comprising a micro-lens matrix between the optical device and the first surface of the body.

48. The laser system of claim 45 further comprising a micro-lens matrix between the optical device and the first surface of the body.

49. The laser system of claim 44 wherein the diode laser bars are able to provide pumping lights to the active waveguides at various pumping levels during laser operation.

50. The laser system of claim 49 further comprising a micro-lens matrix between the optical device and the first surface of the body.

51. The laser system of claim 43 wherein the diode laser bars are able to provide pumping lights to the active waveguides at various pumping levels during laser operation.

52. The laser system of claim 51 further comprising a micro-lens matrix between the optical device and the first surface of the body.

* * * * *